(No Model.) 6 Sheets—Sheet 1.
G. W. HALL.
TYPE WRITING MACHINE.

No. 564,749. Patented July 28, 1896.

Witnesses
John Lepper
T. W. Johnson

Inventor
G. W. Hall
By W. A. Bartlett
Attorney

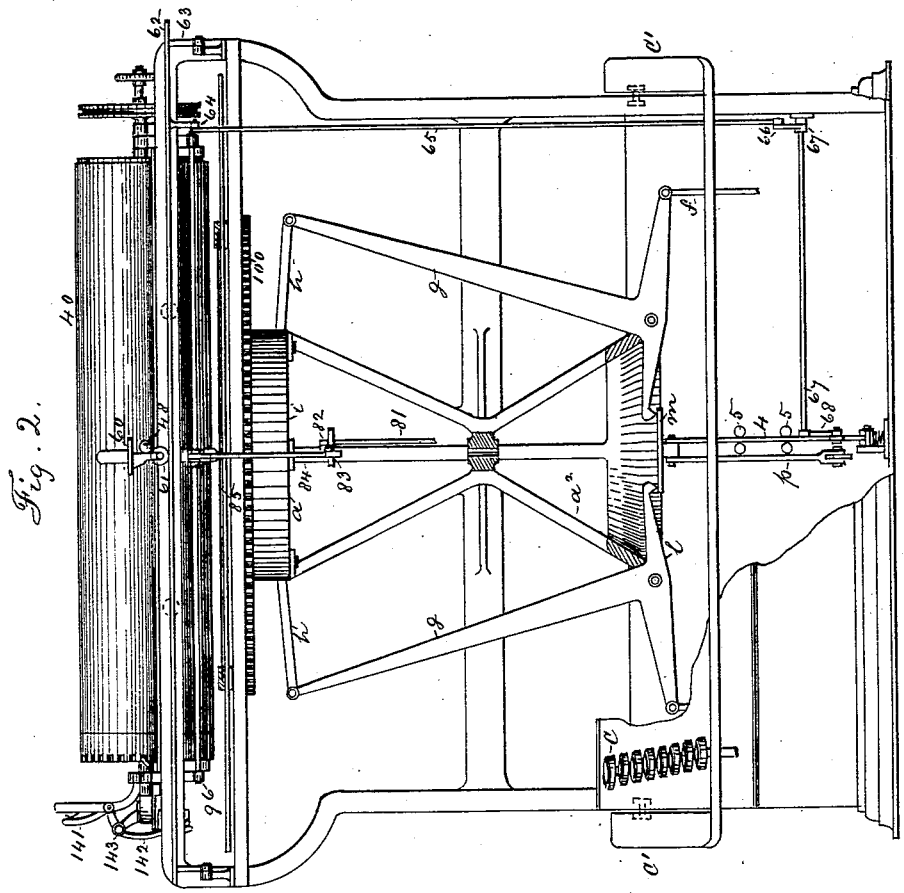

(No Model.) 6 Sheets—Sheet 3.
G. W. HALL.
TYPE WRITING MACHINE.
No. 564,749. Patented July 28, 1896.
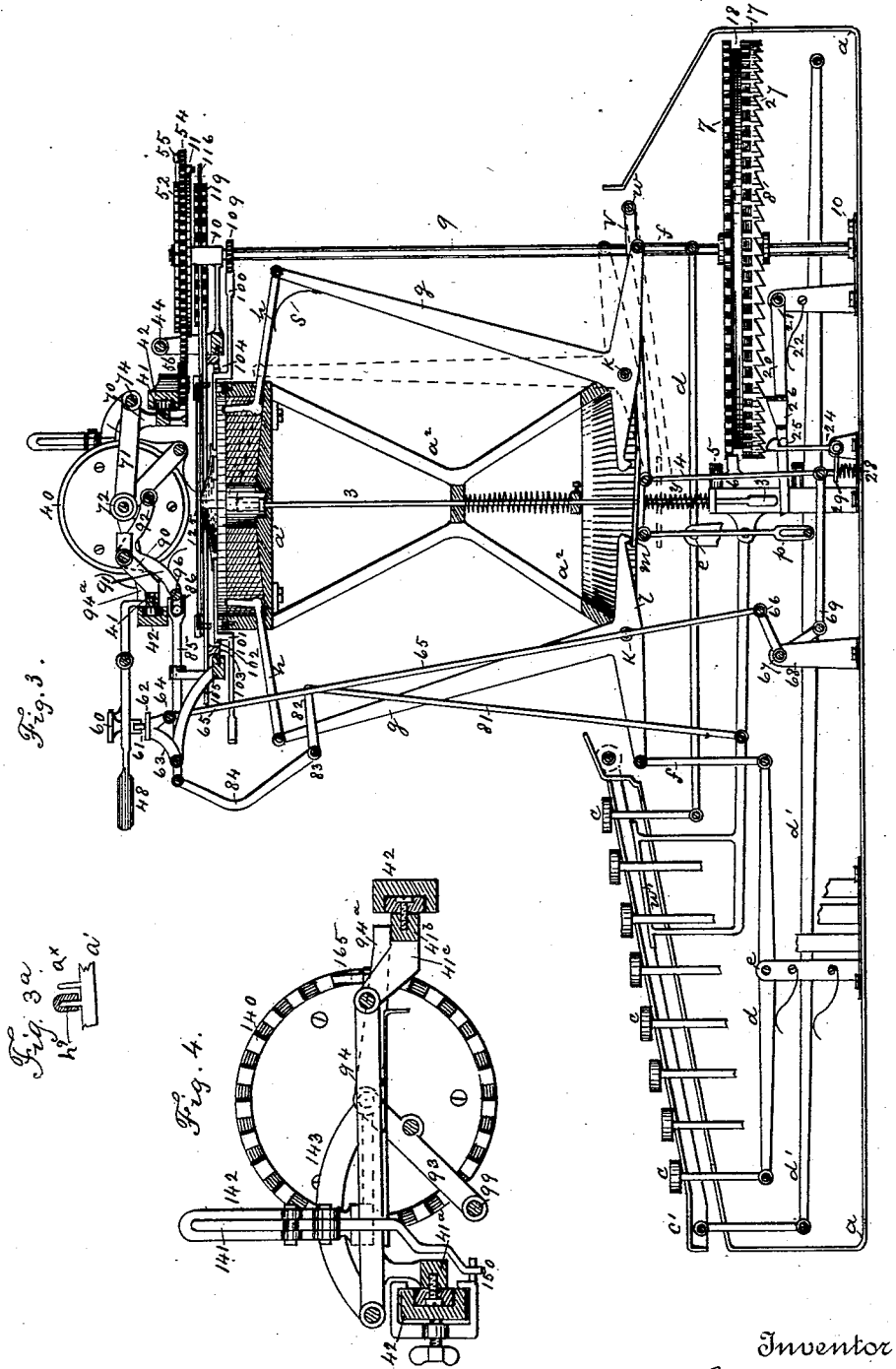
Witnesses
John Lepper
O. W. Johnson
Inventor
G. W. Hall
By W. H. Bartlett
Attorney (No Model.) 6 Sheets—Sheet 4.

G. W. HALL.
TYPE WRITING MACHINE.

No. 564,749. Patented July 28, 1896.

Attest:
J. G. Lepper
O. W. Johnson

Inventor:
G. W. Hall
By W. H. Bartlett
Att'y

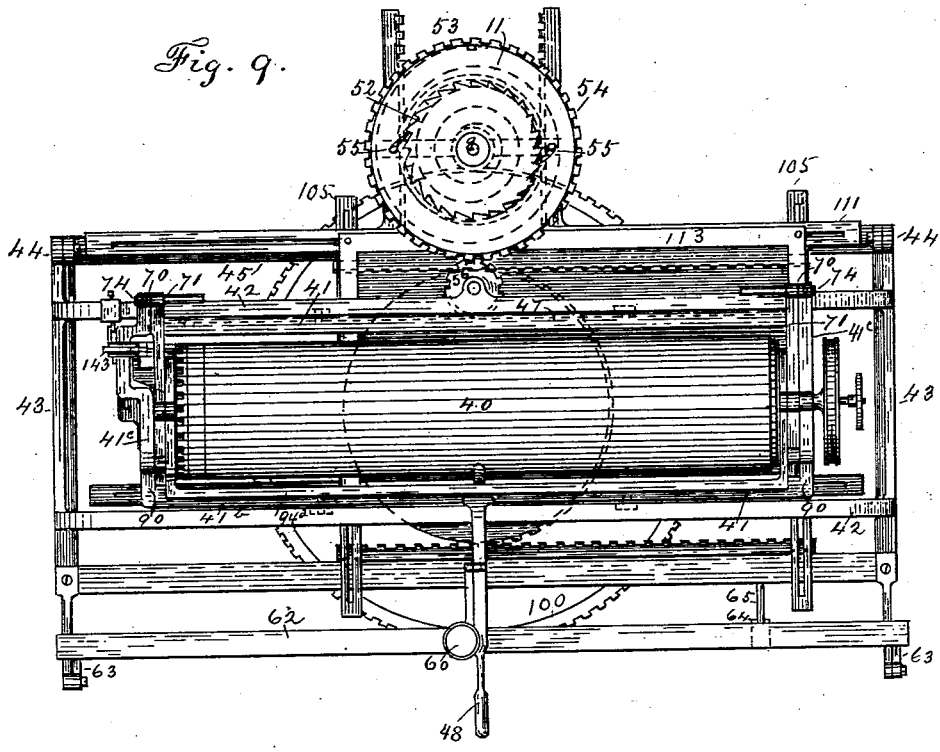

(No Model.)  6 Sheets—Sheet 6.
G. W. HALL.
TYPE WRITING MACHINE.
No. 564,749.  Patented July 28, 1896.
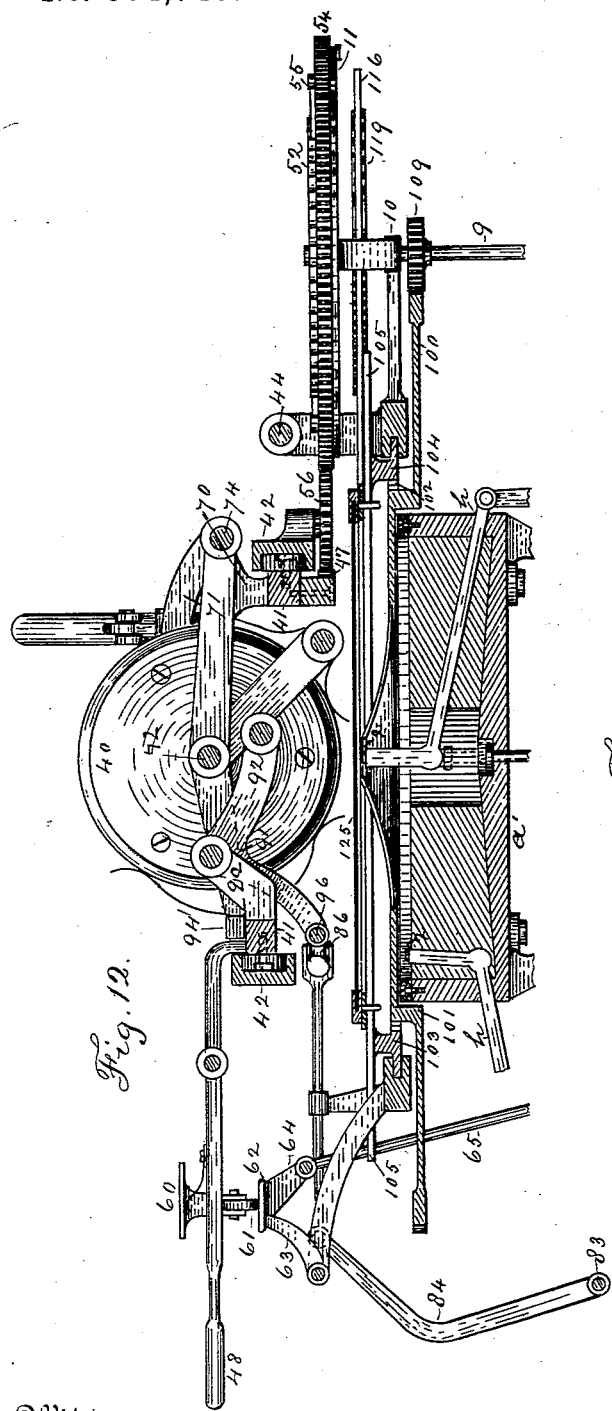
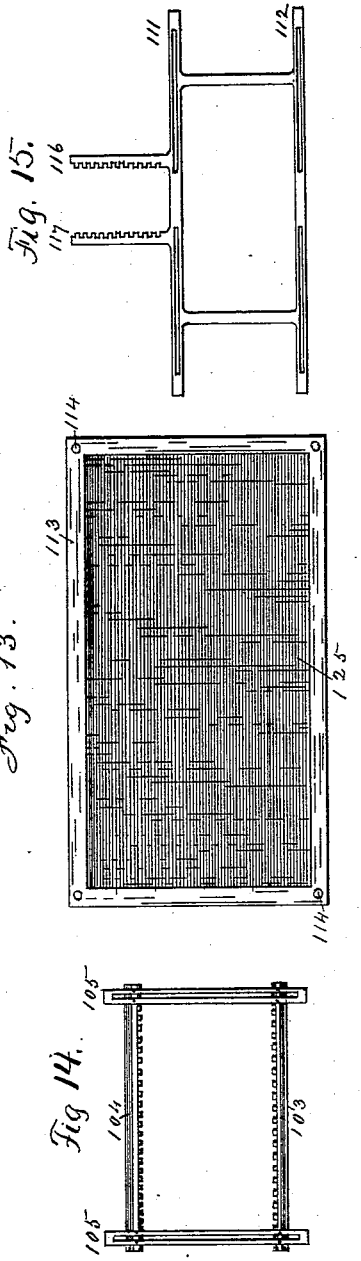
Witnesses
John Lepper
O. W. Johnson
Inventor
G. W. Hall
By W. H. Bartlett
Attorney
THE NORRIS PETERS CO. PHOTO-LITHO., WASHINGTON. D. C.

UNITED STATES PATENT OFFICE.

GEORGE W. HALL, OF WASHINGTON, DISTRICT OF COLUMBIA.

TYPE-WRITING MACHINE.

SPECIFICATION forming part of Letters Patent No. 564,749, dated July 28, 1896.

Application filed October 10, 1890. Serial No. 367,746. (No model.)

*To all whom it may concern:*

Be it known that I, GEORGE W. HALL, residing at Washington, District of Columbia, have invented certain new and useful Improvements in Type-Writing Machines, of which the following is a specification, reference being had therein to the accompanying drawings.

This invention relates to type-writing machines.

The object of the invention is to produce a machine in which the type or printing-characters may be supported on bars in a circle, and by moving a short distance may be brought to a common center and there caused to print; also, to improve the connections from the key-levers to the printing-characters; also, to improve the escapement, and the connection between the same and the key-levers; also, to improve the ribbon-support and the ribbon-moving mechanism; also, to improve the paper-roller or platen in its connection to the carriage, and the means whereby the paper-roller is held; also, to improve various other parts of the machine.

Figure 1:
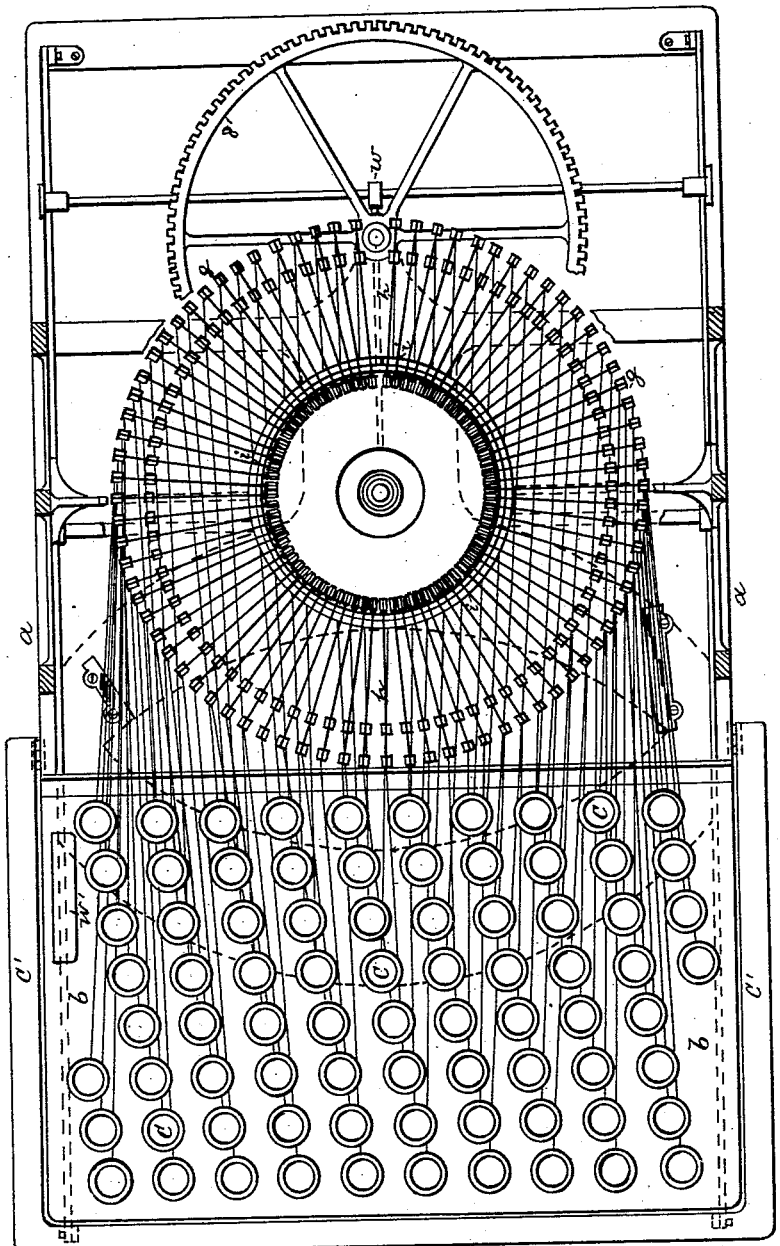
Figure 5:
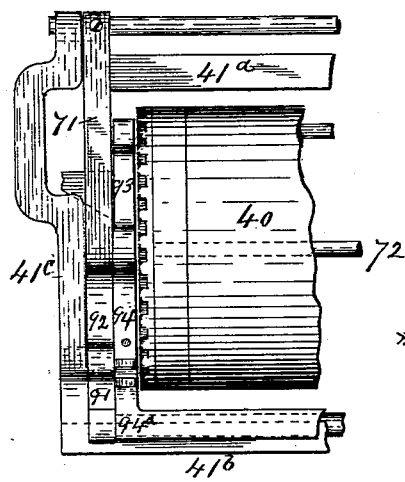
Figure 6:
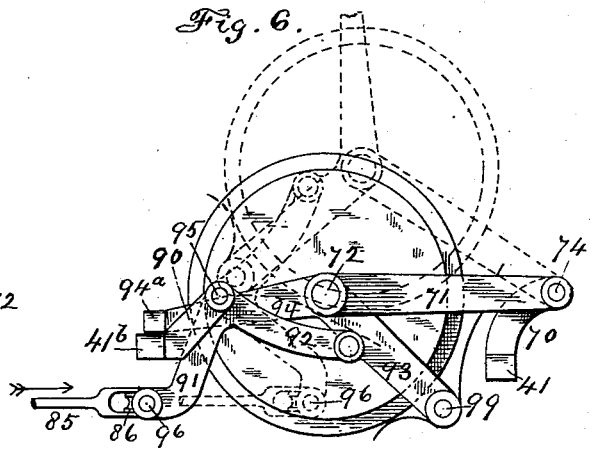
Figure 7:
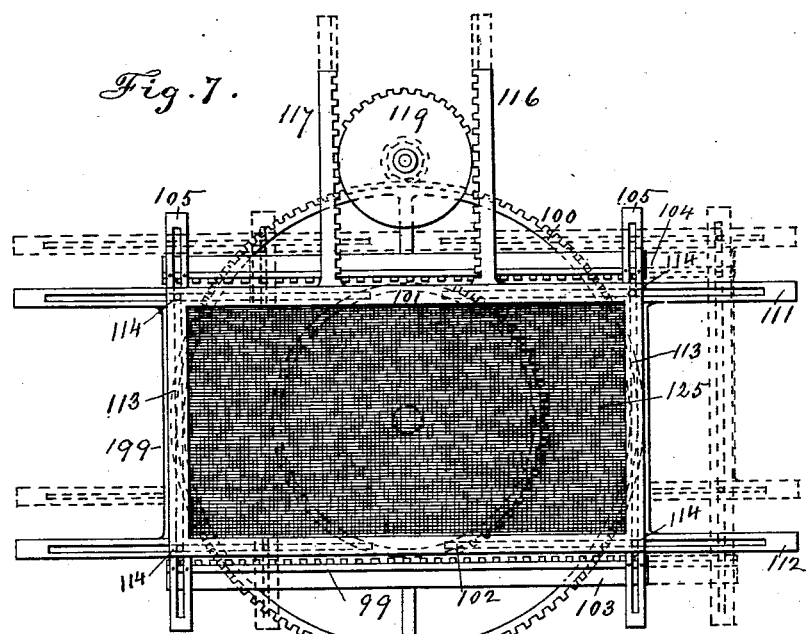
Figure 8:
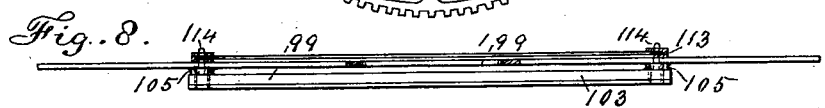

Figure 1 is a plan view of the lower part of the machine, the paper-roller and ribbon-holder being removed, part of the machine being broken away and part shown in section. Fig. 2 is a longitudinal section of the machine, near the center, with the paper-roller and carriage in elevation and part of the keyboard shown in perspective. Fig. 3 is a vertical cross-section of the machine, parts being broken away and parts shown in elevation. Fig. 3ª is a detail showing modified type-bar in cross-section and support therefor. Fig. 4 is an end elevation of the paper-roller and its carriage, the guiding-tracks being shown in section. Fig. 5 is a broken plan of one end of the paper-roll and its carriage. Fig. 6 is an end elevation of the paper-roll and its carriage, the upper position of the roll being indicated in dotted lines. Fig. 7 is a top plan of the ribbon-shifter and ribbon-holding device. Fig. 8 is a rear elevation of same, partly in section. Fig. 9 is a top plan of the paper-roller and its carriage, the ribbon, and the ribbon-shifter. Fig. 10 is a broken plan and section showing connections of the paper-roll to the operating-shaft. Fig. 11 is a broken plan of one end of roller and roller-carriage. Fig. 12 is an enlarged view of the upper portion of the mechanism shown in Fig. 3. Fig. 13 is a detail of the ribbon mechanism. Fig. 14 is a reduced plan of one ink-ribbon frame, and Fig. 15 a similar view of the other ribbon frame or support.

The letter $a$ indicates the base of the machine. The machine has a keyboard $b$ in usual position, provided with keys $c$, connected to levers $d$, which levers are pivoted at suitable points, as $e$, in the frame, and are connected by links $f$ to the operating-levers $g$, which operating-levers are in turn pivoted to the type-bars $h$ of the machine.

The type-bars $h$ are arranged in a circle, as are the bell-crank levers $g$, connected to said type-bars. Each bar $h$ has a guiding-groove $i$ in a central support $a'$, connected to the frame $a$. The bell-crank levers $g$ are pivoted in the lower part of a supporting frame or casing $a^2$, said casing being about in the form of an hour glass and slotted radially at its upper and lower portions. Pivots $k$ support the bell-crank levers $g$ in the lower part of this casing.

Each bell-crank lever $g$ has an arm $l$ extending inwardly from its pivot $k$. The depression of key $c$ rocks lever $d$, lifts link $f$, rocks lever $g$, slides type-bar $h$ radially until the type 2 comes to the center of the machine, and by means of arm $l$ depresses table $m$, and depression of the table $m$ carries down the rod 4 with it, said rod being pivoted below said table and moving between guides 5, which are preferably rollers properly journaled on the frame. The rod 4 has a projection or stop 6, which enters between teeth 7 on the escapement gear-wheel 8, which wheel is carried by shaft 9 at the rear of the machine. Shaft 9 rotates in bearings 10 10 and is driven by a coil-spring 11 with a tendency to turn continuously. The stop 6 on rod 4, entering between the teeth 7, prevents the rotation of the wheel until a downward movement of bar 4 carries stop 6 down from between the teeth 7, when the wheel 8 will be permitted to move under the impulse of its driving-spring.

The wheel 8 has a plain portion 18 below the teeth 7 and a second set of teeth 17 below this plain portion. The teeth 7 and 17 alternate, that is, the teeth 7 are opposite the spaces between teeth 17. When stop 6 is depressed from between teeth 7, it moves in front of one of the teeth 17 and serves as a stop to check the movement of wheel 8 when tooth 17 comes against it.

The lower face of wheel 8 carries a series of ratchet-teeth or inclines 27, corresponding in number with the teeth 7 and 17. These inclines engage a projection 20 on the pivoted hammer 21, and the passage of any incline 27 over the projection 20 depresses said hammer, thus compressing spring 22, which spring 22 tends to lift the hammer. A pivoted trigger 24 has a hook 25, which engages a pin 26 on the hammer 21 when said hammer is pressed down. The trigger 24 is pressed into position to catch the pin 26 by means of spring 28, operating on the arm 29 of the trigger. This arm 29 is in position to be engaged by the lower end of the bar 4 and tripped to release the hammer whenever the bar 4 is depressed by the depression of table $m$. The depression of a key thus moves the type-bar $h$ through the connections described until the type 2 is at the center of the machine. At the same time, through the connections described, the table $m$ is depressed, releasing the escapement, and the hammer 21 is depressed by the operating of the inclines on wheel 8.

The hammer 21 is released at the instant the type reaches the center by the operating of bar 4 on the trigger. Hammer 21 then strikes upward against the hammer-bar 3, which drives the type upward against the inking-ribbon or whatever may be above it in position to receive its impression.

Some of the letters or characters may be restrained in their upward movement. Thus such characters as the period, comma, and some of the smaller letters if driven up with the same force as is applied to a larger letter will penetrate into and nearly through the paper, (a common fault in type-writing machines.) To prevent this, a spring $s$ may be applied at the joint between the type-bars $h$ and levers $g$, and this spring will bear off a great part of the impression from such letters or characters. Of course such spring may be applied to all the letters, and the tension of the spring adjusted according to the force desirable to communicate in writing, but I do not consider it necessary to apply the spring to more than a few of the smaller characters.

The type-bars $h$ can be quite thin, so that a large number (usually about eighty for a type-writing machine) can be arranged in a circumference of a small circle.

Instead of being flat the type-bars may be U-shaped in cross-section, as shown at $h^9$, Fig. 3$^a$, and guided on pins or tongues $a^\times$, extending from the support $a'$ into the hollow of the U-shaped bars.

The table $m$ is supported on an arm or bar $v$, extending from the rock-shaft $w$, which shaft extends across the rear part of the frame. A spring $y$ tends to keep the table $m$ raised. The table need not be actually in contact with the arms $l$ of the levers $g$ when the table is in elevated position, as it is not so important that the table $m$ should begin its movement at the proper instant of time as that it should (through its adjuncts) actuate the trigger and cause the hammer to strike on the hammer-bar and press up the type the instant the type has reached the center of the machine. This can be accomplished by supporting table $m$ in proper position on the bar $v$. It is, however, not essential that the table $m$ should be hung on bar $v$, as it may be otherwise supported and guided so as to have a vertical movement near the bottom of its stroke.

The keys $c$ are restored to their normal position by springs $o$, bearing on levers $d$, or in other suitable and usual manner. An escapement or spacing-key $c'$, connected to lever $d$, has a link or draw-rod $p$, connecting to the table $m$, and by the depression of this spacing-key $c'$ the table $m$ may be depressed, releasing a tooth of the escapement without operating a type-lever.

The paper-carrying roll 40 (sometimes called the "platen") is held in carriage 41, which moves lengthwise of the machine in ways 42, supported on top of the frame. The ways 42 are held together by bars 43, extending across the top of the upright part of the machine. These bars have pivots 44 at their rear end, which pivots connect the bars to a top bar 45, extending parallel with the direction of movement of the carriage at the upper and rear part of the machine.

The entire top of the machine, including the roller, carriage, and carriage-support, can be turned back on the pivots 44, disengaging the escapements and affording free access to the top of the type-bar support for the insertion or removal of the inking-ribbon and the cleaning of the printing-characters.

The upright shaft 9 carries a gear-wheel 54, loosely mounted thereon and connected to one end of a spiral spring 11. The other end of spring 11 is attached to the frame, so that the spring 11 will be wound up or placed under tension as the wheel 54 is turned in one direction and will tend to drive the wheel back again in running down.

A ratchet-wheel 52 is connected to shaft 9 in proximity to the wheel 54. Spring-pawls 55 on the wheel 54 engage the teeth of this ratchet. When the spring 11 is wound by the turning of wheel 54, it drives the ratchet-wheel 52 (by means of pawl 55) and so turns shaft 9 and wheel 8 when free to do so.

A pinion 56 is journaled on the frame in position to mesh with gear 54 and with the rack 47 on the carriage when the carriage is in working position. When carriage 41 is turned back on its pivots, as described, the rack 47 is disengaged from the pinion 56.

When carriage 41 is moved to the right, as by handle 48, the rack 47, engaging pinion 56, drives said pinion and the gear 54 and winds up spring 11. Pawls 55 on the gear serve to clutch the gear 54 with the ratchet on shaft 9, so that the spring will tend to drive the shaft. As the shaft is permitted to move with a step-by-step motion, through the mechanism described, the carriage will be driven along on its ways by the intermeshing gears.

To disengage the escapement entirely, the button 60 on the carriage is pressed down. This button or key 60 carries at its lower end a small wheel 61, which runs on top of a guide-track 62, which track extends along the entire front of the machine and is supported on brackets 63, pivoted to the cross-bars at the end of the machine. The bar or track 62 has a bracket 64 rigidly affixed thereto. A rod 65 extends from this bracket 64 to an arm 66 on rock-shaft 67 near the base of the machine. The rock-shaft 67 is supported in suitable bearings and has an arm 68, to which a link 69 is pivoted. The inner end of link 69 engages with the bar 4, and when the key or button 60 is depressed this link is moved lengthwise and pulls the lower end of bar 4 and its projection 6 away from the wheel 8, thus disengaging the projection or stop 6 from said wheel and permitting the wheel to rotate in either direction. The carriage is then free to move either to the right or left without hindrance from the escapement mechanism. The track 62 will be restored to position by a suitable spring whenever the key 60 is released.

The carriage may also be lifted so as to disengage rack 47 from pinion 56, when the carriage may be moved without winding spring 11. The tension of spring 11 can be thus readily regulated by engaging the carriage with the escapement at such point as is desirable.

The carriage 41 has front and rear bars 41$^a$ and 41$^b$ and end pieces 41$^c$. The cross-bars 41$^c$ of the carriage have grooves in which the shaft 72 of the paper-roll rests when the roll is down in writing position. The rear bar 41$^a$ of the carriage carries a pair of brackets 70, extending upward above the supporting-bar 42 of the frame. A link 71 is pivoted to the bracket 70 at each end of the roller-carriage. These links 70 have bearings for the axial shaft 72 of the paper-roller 40, and the roller may be lifted up on these links, as shown in dotted lines, Fig. 6, the links 71 turning on their pivots 74, which connect them to the brackets.

A key or push lever $w'$ on the keyboard is connected to a lever 80, and a draw-rod 81 connects this lever to an arm 82 on the rock-shaft 83 at the front of the machine. Rock-shaft 83 has an arm or lever 84, which in turn is pivoted to a push-bar 85, and the push-bar 85 carries an antifriction-roll 86 at its inner end.

The front bar 41$^b$ of the paper-carriage has a bracket 90 at each end. A bell-crank lever 91 at each end of the roller 40 is pivoted to the bracket 90. The inner end 92 of the lever is pivoted to a bent or V-shaped lever or bar 93, which centers on the pivotal shaft 72 of the roll and has one end 94 bearing on the bar 41$^b$ of the frame. The bars or levers 93 94 and the bars 94$^a$ and 99 constitute a frame or cradle in which the roller may be lifted or swung away from the carriage for inspection or correction of the writing. When the push-rod 85 is pushed in the direction of the arrow, Fig. 6, the roll 86 bears on the rod 96, which connects the two levers 91. This rocks the levers 91 92 and lifts the levers 93 and shaft 72, swinging the paper-roller upward on the links 71, which turn on the pivots 74. The roller is thus thrown upward into the position shown in dotted lines, Fig. 6, and as the pivot 96, which connects the lever-arm 92 with the lever 93, moves in a circle about the pivot 95 that part of the roll which was at the bottom is turned to the front, so as to occupy a position above and nearly at right angles to its position when the roll is turned down.

It is apparent that the push-rod 85 may be pressed in by the described connection from the keyboard or it may simply have a button at its outer end and be pressed in by the hand of the operator.

The movement to the paper-roller resulting from the links and levers supported on the carriage-frame is, I believe, entirely novel and is most important and useful in typewriting machines.

The levers 94 are preferably connected by a bar 94$^a$ at the front of roll 40, and this arm lies on the front bar of the carriage when the roller is down in position to be written on.

The ribbon movement is a double reciprocation caused by mutilated gears working on racks connected to the ribbon-support. A gear-wheel 100 has its hub or inner rim 101 supported on the upper part of the standard $a'$. The central part of this wheel is open. A mutilated gear 102 surrounds the outer part of the hub or wheel-rim. A rectangular frame 99, composed of front bar 103, back bar 104, and connecting end pieces 105, surrounds the mutilated gear 102. Gear-wheel 100 is driven by pinion 109 on shaft 9. As the gear 100 rotates, its mutilated pinion 102 engages alternately with rack-teeth on the edges of bars 103 and 104, thus reciprocating the frame of which those bars form a part alternately to the right or to the left, accordingly as the mutilated gear engages one or the other of the bars. The bars 105 are slotted lengthwise and preferably extend some little distance in front and rear of the bars 103 and 104, and are attached to the upper surfaces of said bars, so that frame 99 may reciprocate lengthwise of rack-bars 103 and 104 with bars 103 and 104 in the plane of the mutilated gear 102, but the cross-bars 105 will ride above said gear. A second frame 199 rides on top of frame 99. This frame is composed of slotted side bars 111 and 112, and cross-slats may connect the same, although the frame of the ribbon may be used instead of cross-slats.

The ribbon 125 is mounted in a rectangular frame 113. This frame is preferably a light sheet-metal piece turned over the edges of the ribbon. The corners of the frame have perforations, and pins 114 pass through these perforations and into the slots in bars 105, 111, and 112. Bar 111 has projecting arms 116 and 117, having rack-teeth on their inner faces, and these rack-teeth alternately engage the teeth of a mutilated gear 119 on shaft 109. The rotation of wheel 100 by pinion 109 drives mutilated gear 102, and this by its alternate engagement with the racks on frame 99 shifts said frame alternately to the right and to the left of the machine. The alternate engagement of the mutilated gear 119 with the racks on bars 116 and 117 shifts frame 199 alternately backward and forward on the machine, each frame being free to make its own movement independently of the other. The ribbon-frame is made to partake of the movement of both frames 99 and 199, by reason of the pins 114, which pass through the slots in both frames. The length of these slots is such as to permit a compound movement of the ribbon, the bars 111 and 112 in their crosswise movement carrying the pins 114, and consequently the ribbon, crosswise of the frame, and the bars 105 moving these pins and the ribbon lengthwise of the frame.

The ribbon-moving frames are of light sheet metal, and weigh but a few ounces.

The ribbon and its metallic frame or binding can be lifted off from pins 114 when the carriage is turned back, and replaced by another, in a few seconds. The entire surface of the ribbon is used, and the wear is equal on all parts. The expense of ribbons is not great, and the ability to change one ribbon for another almost instantly is an important advantage of this machine.

The roll 40 is carried on shaft 72 and turns with said shaft. Shaft 72 is free to move endwise in the roll 40. One end of shaft 72 bears a cross-bar 130, carrying a wedge-shaped clutch-piece 131, which is in position to engage with a trip 132, which has a conical interior surface. A cup 133 on the end of roll 40 covers the trip 132. The wedge-arms 131 on bar 130 pass through holes in the bottom of this cup 133. The shaft of the roll extends from the bottom of this cup. Rod 72 may be slipped endwise by means of roll or finger-piece 135, and thus couple or uncouple the wedge 131 with the trip 132. When the clutch is uncoupled, roll 40 is free to turn with shaft 72 to any distance and in either direction. Trip 132 bears the ratchet-gear 140 at the end of the roll, and when the friction-clutch just described is coupled the roll 40 turns with this ratchet. The ratchet is caused to turn the distance of one or more teeth, as the carriage is drawn back, by means of pawl 141, which is pivoted in bell-crank lever 142, which lever is pivoted to an arm 143 of the carriage. The end of lever 142 is in line with a stop 150 on the carriage, so that the lever strikes said stop as the carriage completes its backward movement—that is, the movement to the right in shifting the carriage. This engagement of the pawl 142 with pin 150 is at any predetermined point, as the pin 150 is adjustable on the frame. The rocking of lever 142 is checked by stop 150, which stop is carried by a clamp-piece 151. This piece 151 may be adjusted to any suitable position on the bar 42 of the frame, held by a set-screw or other clamp. Its position determines the amount of movement of lever 142, and hence the rotation of the roll 40. The ratchet 140 is held against backward movement by a spring-stop 165, which has friction engagement with the ratchet, but will permit the same to turn in either direction when sufficient force is applied, as is common in this art.

This machine is susceptible of alterations and modifications. While the parts described are adapted to produce a harmonious operative machine, it is apparent that some parts may be used in machines of different construction. Thus the ribbon-shifting mechanism may be used whether the roller-shifting mechanism be of the described construction or not, and vice versa. A part of the frames described for shifting the ribbon may be omitted without altering the movement. One ribbon-frame may be omitted. The ribbon may be entirely omitted if other inking mechanism be supplied. The carriage movement is not entirely dependent upon the particular escapement, as other escapements may be used, and numerous other changes may be made within the spirit of the invention.

What I claim is—

1. In a type-writing machine, the combination of the annular supporting-frame having radial slots therein, the series of type-bars arranged in said slots, a bell-crank lever pivoted to each type-bar, said levers pivoted in a circle about the annular frame, and operating-levers pivoted to said levers and all connected to keys at one side of the frame, the parts in combination substantially as described.

2. In a type-writing machine, a series of type-bars arranged radially in grooves in a suitable support, a bell-crank lever $g$ connected to each type-bar, and key mechanism connected to each bell-crank lever, an arm $e$ on each bell-crank lever extending inwardly, and a table $m$ under all these arms and movable by any of the arms, all in combination substantially as described.

3. The combination of the type-bars and adjunctive mechanism for moving the bars to the operating-center, a hammer-bar in position to strike the type-bars at this center, a hammer and a trigger for releasing said hammer at the instant the type is at the operating-center of the machine, and the paper-carrier at the opposite side of the printing part of the type-bar from the hammer, substantially as described.

4. In a type-writing machine, the series of type-bars arranged radially as described, the series of bell-crank levers connected to said bars and to the key mechanism, an arm extending inwardly from each of said levers, and a table in position to be depressed by any of said arms, and a rod operated by said table and engaging the escapement-wheel, all combined substantially as described.

5. In a type-writing machine, the series of type-bars and bell-crank levers connected thereto and to the keys, the arms on said levers and a table in position to be depressed by said arms, a rod operated by said table and engaging the escapement-wheel, and a hammer operatively connected to said escapement-wheel to strike one of the type-bars as the escapement moves, all combined substantially as described.

6. The feed-wheel 8 having two sets of operating-teeth and a plain annular surface between said teeth, driving connections from said wheel to the paper-carriage, the table $m$ connected to the key mechanism, and the rod connected to said table and having a stop to enter the space between the sets of teeth, and movable into the interdental spaces of either set of teeth, all combined substantially as described.

7. The combination of the table $m$, the bell-crank levers connected to the key-levers and actuating the table $m$ in one direction, a link connected to the table and having a stop in position to engage the teeth of the escapement, and a trigger acted on by said link to release the hammer or striker, substantially as described.

8. The combination with the table $m$, its actuating devices, the escapement-wheel 8, and connections from said wheel to the carriage, of a link connected to table $m$, a stop on said link in position to engage the teeth of the escapement-wheel, and a draw-rod connected to said link, whereby the same may be shifted out of engagement with the escapement-wheel, substantially as described.

9. The combination with the escapement gear-wheel 8, having two sets of teeth and a plain annular surface between of a stop reciprocating between the teeth on said gear, and a draw-bar by which the stop is swung clear away from the escapement-wheel, leaving the latter free to rotate, substantially as described.

10. In a type-writer, an escapement gear-wheel having two series of gears or teeth separated by an open annular space, the teeth of one series being opposite the spaces of the other series, adjunctive mechanism by which the wheel is driven, and a reciprocating stop arranged substantially as described to move from one series of teeth to the other, producing a step-by-step movement of the wheel, substantially as described.

11. The combination with the escapement-wheel having two sets of teeth and a stop engaging said teeth to produce a step-by-step movement, a series of inclines on said wheel, of a spring-pressed hammer in position to be acted on by the inclines, a hammer-bar actuated by the hammer, and a trigger by which the hammer is released, substantially as described.

12. In a type-writer, the combination of a rotating escapement-wheel and adjunctive connections therefrom to the carriage, the reciprocating table and a link connected thereto having a stop which engages teeth on the escapement-wheel, a draw-rod connected to the table, and connections whereby the draw-rod may be actuated to actuate the table and release the escapement-wheel, substantially as described.

13. The combination of the table $m$ and the levers acting thereon, the link connected to said table and having a stop in position to engage the escapement-wheel 8, and guide-rolls arranged as described to guide the link but to permit it to swing in the direction of the length of the guide-rolls, substantially as described.

14. The toothed wheel 8 having two sets of teeth surrounding its periphery one set of teeth opposite the interdental spaces of the other set, and a plain annular portion between the sets of teeth, the wheel-shaft and carriage-driving spring connected therewith, the key-levers and table actuated thereby, and a stop operated by the table and operating alternately in the teeth of the wheel, all combined substantially as described.

15. The combination with the roller-carriage, of a gear having driving engagement with a rack on the carriage, a coiled spring having clutch engagement with said gear, and an escapement-shaft having clutch engagement with the gear in one direction, substantially as described.

16. The combination with the carriage having a rack, of a gear-wheel having driving engagement with said rack, a shaft on which said wheel is loosely mounted, a spring connected to the wheel and tending to drive the same in one direction, a clutch by which the wheel may be coupled so as to move with its shaft, and a step-by-step releasing mechanism by which the shaft may be permitted to move the distance of a space at a time, substantially as described.

17. The combination of the carriage having a rack, a gear-wheel connecting to said rack, a spring connected to the frame and to the gear, the shaft on which said gear is loosely mounted and means for coupling the shaft and gear together, a toothed wheel 8 on the shaft engaging a reciprocating stop connected to the key mechanism, and means for throwing said stop out of engagement so that the carriage will be free to rotate the first-mentioned gear-wheel and its shaft, substantially as described.

18. The escapement gear-wheel 8 connected to the carriage-driving mechanism substantially as described, the lever 4 having stop 6 engaging said gear as described, the train of levers leading from the stop 6 to guide-track 62, and means for depressing said guide-track and so releasing the escapement, substantially as described.

19. The combination with the carriage of the paper-roller connected thereto by links as described, and a toggle supported on the carriage and engaging the roll to lift the same from the carriage, substantially as described.

20. The carriage, the roller supported thereon, and a train of levers connected to a key on the keyboard, and acting on the roll-supports whereby the key may be moved to throw the roll and its printed matter into position for reading in combination substantially as described.

21. In a type-writing machine, the carriage, the paper-roller, links pivoted to the carriage and to the roller, a compound lever connected to the carriage and to the roller, and a push-bar acting against said lever to lift the roller, all combined substantially as described.

22. The combination of the carriage, the paper-roller connected thereto by links, bent levers pivoted on the roller-shaft, and bell-crank levers pivoted on the carriage and forming with the bent levers a system of toggle-levers whereby the roller may be raised from the carriage, substantially as described.

23. The combination with the carriage and roller of a lever connected thereto and to the roller, and a push-bar acting on the lever to lift the roller from the carriage, substantially as described.

24. The combination with the roller and shaft of a lever or bar at each end of the roll and supporting said roll, a bar connecting these bars at the side of the roll, and a lever connected to the carriage and one of the end bars whereby the roller and its frame may be lifted from the carriage, substantially as described.

25. The combination with the carriage having a longitudinal travel on the frame, of the roller, links connected to the carriage and to the roller at one side of the carriage, a lever connected to the carriage and to the roller-support at the other side of the carriage whereby the roller may be lifted from the carriage, substantially as described.

26. The combination with a type-writing machine, of a traversing frame, and an inking-ribbon having a metallic binding which rests on said traversing frame, substantially as described.

27. The combination with a moving part of a type-writing machine of a longitudinally-reciprocating ribbon-supporting frame, a laterally-reciprocating ribbon-supporting frame, and a ribbon supported on these frames and connected thereto so as to partake of the motions of both, substantially as described.

28. The combination with a wheel of a type-writer rotating on a horizontal axis, of a ribbon-supporting frame connected to said wheel to reciprocate with the rotation of the wheel, substantially as described.

29. In a type-writer, the combination of a longitudinally-reciprocating ribbon-frame having a slotted bar, a laterally-reciprocating frame connected thereto and having a slotted bar, and pins connecting the slotted bars so that one frame will move with the other in one direction, while leaving it free to have its own motion in another direction, substantially as described.

30. The combination of a longitudinally-reciprocating frame and a mutilated gear alternately engaging racks thereon, a laterally-reciprocating frame and a mutilated gear alternately engaging racks thereon, said frames connected to give a compound movement as described, and a ribbon resting on one of the frames, substantially as described.

31. The combination of the reciprocating frame and its pins, with a ribbon having a metallic binding with which the pins engage, substantially as described.

32. The combination with the ratchet driving-gear on the roller-shaft, of a roller separate from said gear, and a friction-clutch by which the roll and gear may be thrown into or out of engagement at any part of the circle.

33. The combination with the roller-shaft, of a ratchet-wheel thereon having an inclined cup, a roller in proximity to said cup, and a wedge carried with the roller in position to engage the incline of the cup, substantially as described.

In testimony whereof I affix my signature in presence of two witnesses.

GEO. W. HALL.

Witnesses:
W. A. BARTLETT,
T. W. JOHNSON.